United States Patent [19]
Goldschmidt et al.

[11] Patent Number: 5,683,163
[45] Date of Patent: Nov. 4, 1997

[54] ADJUSTABLE INDICATOR ASSEMBLY FOR VEHICLE LAMP

[75] Inventors: Karol Goldschmidt; Heiko Briese, both of Lippstadt, Germany

[73] Assignee: Hella KG Hueck & Co., Lippstadt, Germany

[21] Appl. No.: 641,644

[22] Filed: May 1, 1996

[51] Int. Cl.⁶ ................................................. B60Q 1/06
[52] U.S. Cl. .................... 362/66; 362/61; 362/284; 362/428; 33/288
[58] Field of Search .......................... 362/61, 66, 284, 362/289, 287, 421, 427, 428, 282, 324, 322; 33/288, 335

[56] References Cited

U.S. PATENT DOCUMENTS

| | | | |
|---|---|---|---|
| 4,731,707 | 3/1988 | McMahan et al. | 362/66 |
| 4,916,583 | 4/1990 | Nagasawa | 362/61 |
| 4,984,136 | 1/1991 | Yamagishi et al. | 362/61 |
| 5,032,964 | 7/1991 | Endo et al. | 362/61 |
| 5,065,293 | 11/1991 | Mochizuki | 362/61 |
| 5,067,056 | 11/1991 | Suzuki et al. | 362/66 |
| 5,091,829 | 2/1992 | Hendrischk et al. | 362/61 |
| 5,121,303 | 6/1992 | Shirai et al. | 362/61 |
| 5,138,542 | 8/1992 | Daumueller et al. | 362/420 |
| 5,197,794 | 3/1993 | Scott et al. | 362/80 |
| 5,343,372 | 8/1994 | Shirai et al. | 362/66 |

FOREIGN PATENT DOCUMENTS

| | | |
|---|---|---|
| 0 692 403 | 1/1996 | European Pat. Off. |
| 43 33 769 | 4/1995 | Germany |

Primary Examiner—Thomas M. Sember
Attorney, Agent, or Firm—Griffin, Butler, Whisenhunt & Kurtossy

[57] ABSTRACT

An adjustable indicator assembly for indicating a position of a reflector (14) in a vehicle lamp (10) includes an adjustable indicator follower (42) for moving axially along a rotatable threaded shaft (18). The adjustable indicator follower defines a laterally-opening mouth for receiving multiple, intertwined, male indicator threads (40) of the threaded shaft. The adjustable indicator follower can be moved laterally to bring a female follower thread, in the laterally-opening mouth, into and out of engagement with the male indicator threads of the threaded shaft. The adjustable indicator follower rides in a stationary track (44) which allows this axial and lateral motion of the adjustable indicator follower. Hand grips (56a and b) allow an operator to move, by hand, the adjustable indicator follower. The adjustable indicator follower has spring arms (48a and b) for engaging opposite sides of a guide rib (76) and a rear guide surface (74).

9 Claims, 2 Drawing Sheets

ADJUSTABLE INDICATOR ASSEMBLY FOR VEHICLE LAMP

BACKGROUND OF THE INVENTION

This invention relates to devices used for adjusting positions of reflectors in motor vehicle lamps (usually head lamps) and more specifically relates to adjustable indicator assemblies included with such adjusting devices for indicating positions of reflectors.

Such adjusting indicator assemblies are described in German Offenlegungsschrift DE 43 33 769, European Patent Application (EP 0 692 403) and U.S. Pat. No. 5,091,829 to Hendrischk et al. In German Offenlegungsschrift DE 43 33 769 a threaded shaft is rotated to cause a follower nut, attached to a reflector, to move therealong for adjusting the position of the reflector. An indicator also moves along the threaded shaft for providing a position indication on a scale. The scale is mounted on a scale member which is mounted on a track. The scale member can be moved along the track for calibrating, or "zeroing" the reading of the indicator. A problem with this system is that the scale member does not have positive engagement with the threaded shaft, or with the indicator, and therefore could inadvertently move separately from these members. Yet another difficulty with this system is that if the scale member is attached to the track too tightly, it is difficult to finely adjust its position. The system in European Patent Application EP 0 692 403 involves the use of a transparent tubular member which has a transparent follower mounted thereon for calibrating (zeroing) a position of a screw attached to a reflector which moves in the transparent tubular member. The follower is used as a scale member and can be moved along the tubular member for calibration by means of a tool. This system requires the use of a tool and it is difficult to read a reflector's position because the transparent members become dirty.

Although the system described in U.S. Pat. No. 5,091,829 to Hendrischk et al. does not require a tool for adjustment, this system has the problem that it cannot be as finely adjusted as desirable because it requires engagement of toothed wheels. The teeth cannot be so small that they are not sufficiently sturdy. Further, this structure is somewhat vulnerable to damage and under some circumstances, is difficult to manufacture and mount.

It is an object of this invention to provide an adjustable indicator assembly for indicating a position of a reflector of a vehicle lamp which can be easily zeroed by hand, which can be finely positioned to indicate a correct setting of a reflector, which provides a great movement of an adjustable indicator follower for a small movement of a threaded shaft used to adjust the reflector, which is quite sturdy and not easily damaged, which provides positive engagement between an adjustable indicator follower and the threaded shaft so that the adjustable indicator follower cannot easily be inadvertently moved, and which is relatively easy to manufacture and mount.

SUMMARY OF THE INVENTION

According to principles of this invention, an adjustable indicator assembly for indicating the position of a reflector of a vehicle lamp includes an adjustable indicator follower defining a laterally-opening mouth for receiving male indicator threads of a threaded shaft which is rotated to adjust a position of a reflector. The adjustable indicator follower has a female follower thread in the mouth for engaging the male indicator threads when the adjustable indicator follower is brought into threaded engagement with the threaded shaft. The adjustable indicator follower rides in a stationary track which allows the adjustable indicator follower to be moved laterally into and out of threaded engagement with the male indicator threads of the threaded shaft and for allowing the adjustable indicator follower to move longitudally along the threaded shaft, while not allowing the adjustable indicator follower to rotate with the threaded shaft. Thus, the adjustable indicator follower can be moved laterally toward the threaded shaft to be placed in threaded engagement with the threaded shaft so as to move longitudally along the threaded shaft as the threaded shaft is rotated to indicate a position to which the reflector is adjusted by the threaded shaft; and the adjusting indicator follower can be moved laterally away from the threaded shaft to remove it from engagement with the threaded shaft so that it can then be moved longitudally along the threaded shaft for calibrating it to a desired position along the threaded shaft.

Lips of the adjustable indicator follower for forming the mouth snap more than 180° about the threaded shaft to maintain engagement between the adjustable indicator follower and the threaded shaft. Handgrips are formed at opposite sides of the adjustable indicator follower for snapping the adjustable indicator follower away from and toward the threaded shaft. The track has a guide rib and the adjustable indicator follower has two spring arms positioned on opposite sides of the guide rib pressing against a wall of the track to bias the follower toward threaded engagement. The adjustable indicator follower has freedom of longitudally movement along the threaded shaft, in both directions, until the female follower thread no longer engages the male indicator threads, with the adjustable indicator including stops at opposite ends of the track for ensuring that the adjustable indicator follower is not released when the female follower thread loses engagement with the male indicator threads. The male indicator threads comprise multiple intertwined threads, each thread having a coarse pitch, whereas there is only a single female follower thread.

BRIEF DESCRIPTIONS OF THE DRAWINGS

DESCRIPTION OF THE PREFERRED EMBODIMENT

Figure 1:
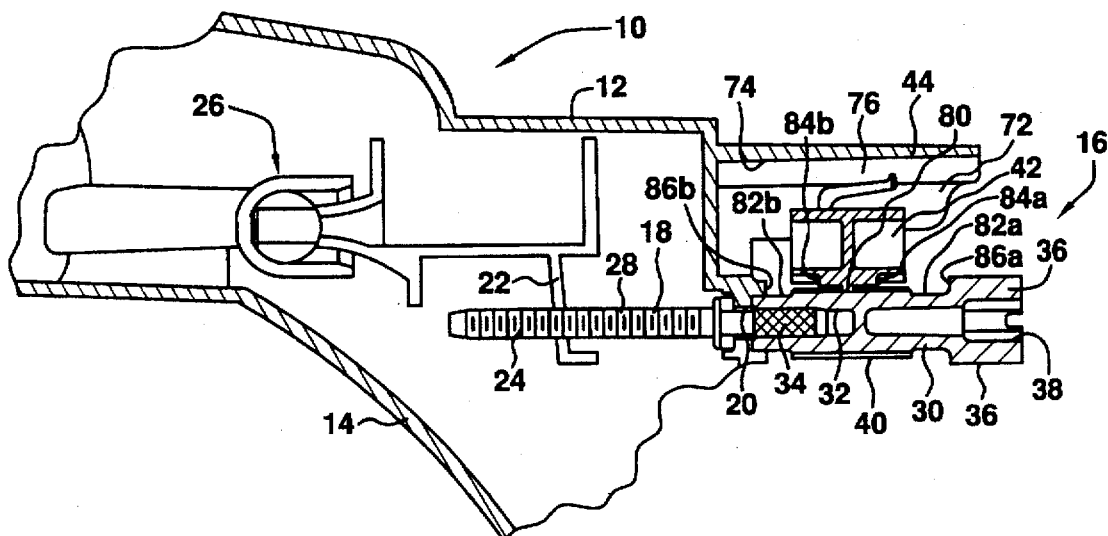
FIG. 1 is a top cross sectional view of a segment of a vehicle headlight having an adjustable indicator assembly of this invention mounted thereon.
Figure 2:
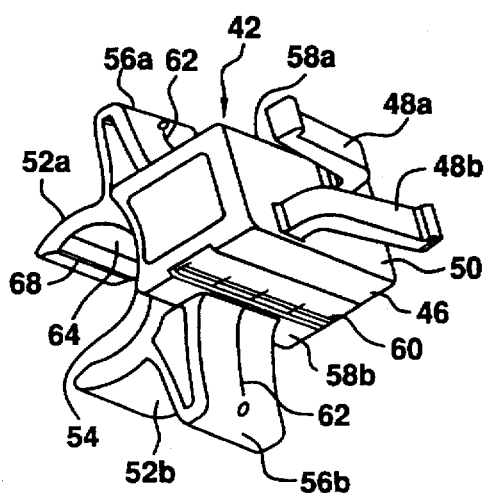
FIG. 2 is an enlarged isometric view of an adjustable indicator follower of the adjustable indicator assembly shown in FIG. 1.
Figure 3:
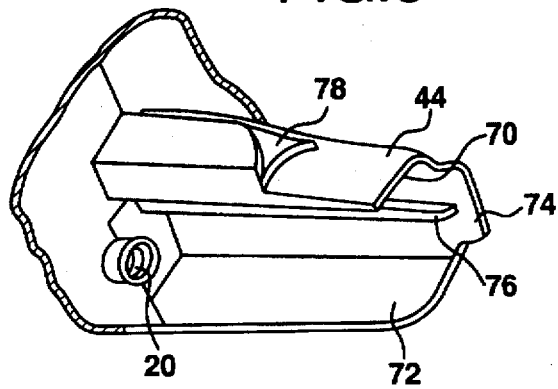
FIG. 3 is a segmented view of a stationary track of the adjustable indicator assembly of FIG. 1.

A headlight 10 has a stationary, or fixed, housing 12, an adjustable reflector 14, and an adjusting mechanism 16 for interconnecting the stationary housing 12 and the reflector 14. Basically, the adjusting mechanism 16 includes: a threaded shaft 18 which is mounted for rotation (but not longitudinal movement) in a bore 20 in the stationary housing 12; a nut (female threaded member) 22 which threadingly engages operational threads 24 of the threaded shaft 18; and a ball and socket 26 interconnecting the reflector 14 and the nut member 22. When the threaded shaft 18 is rotated in the bore 20, the nut member 22 is thereby caused to move along the operational threads 24 and move the reflector 14 for causing an adjustment of the reflector 14.

The threaded shaft 18 comprises two members, namely, an operational-thread member 28, which extends through the bore 20, and a knob 30 (having a blind hole 32 therein) for tightly receiving a knurled outer end 34 of the operational-thread member 28. The knob 30 is constructed of plastic and is forced fitted onto the knurled outer end 34. The knob 30 has a multi-sided grip 36 which defines a multi-sided cavity 38. The threaded shaft 18 can be rotated by a hand or a tool engaging the outer or inner surfaces of the multi-sided grip 36.

An adjustable indicator assembly of this invention includes male indicator threads 40 formed on the outer surface of the knob 30, an adjustable indicator follower 42 and a stationary track 44 affixed to the stationary housing 12.

The male indicator threads 40 are formed of intertwined multiple threads, each of which has a coarse pitch. For example, with reference to FIG. 7, one of these threads 40a is separated by three intertwined threads 40b, c, and d. In this embodiment, each of these threads 40a–40d has a pitch of four mm.

The adjustable indicator follower 42 has a rectangular main body 46 with spring arms 48a and 48b mounted on a rear surface 50, arc-shaped lips 52a and b mounted on a front surface 54, winged handgrips 56a and b respectively extending from top and bottom surfaces 58a and b. Each of the top and bottom surfaces 58a and b has a scale 60 thereon, including a zero point and left and right indications. A rear surface of each of the winged handgrips 58a and b also has an indicia 62 thereon corresponding to the zero point of the adjacent scale 60. Each side of the adjustable indicator follower 42 is a mirror image of the opposite side so that this member can be mounted with either side facing upwardly. This simplifies manufacture and installation of this element.

The arc-shaped lips 52a and b together define a circular cavity or mouth 64 which can be snapped about the male indicator threads 40 on the knob 30. In this regard, there are snapping ramps 68 at outer tips of the arc-shaped lips 52a and b which allow the lips 52a and b to easily slid on the male indicator threads 40 when the adjustable indicator follower is moved laterally toward the male indicator threads 40 so that the arc-shaped lips 52a and b snap about the male indicator threads 40. In other words, the arc-shaped lips 52a and b can be extended more than 180 20 about the male indicator threads 40 to hold the adjustable indicator follower 42 snapped onto the male indicator threads 40.

Thus, the adjustable indicator follower 42 can be moved laterally relatively to the male indicator threads 40 so that the adjustable indicator follower 42 can be snapped onto and off of the male indicator threads 40. The winged handgrips 56a and b enable a user to apply pressure to the adjustable indicator follower for creating this laterally snapping movement.

With regard to the lateral movement, the stationary track 44 is designed to allow this movement. The stationary track 44 is basically trough shaped (or U-shaped) so as to define top and bottom guide surfaces 70 and 72, a rear guide surface 74, and a guide rib 76 extending parallel to the top and bottom guide surfaces 70 and 72 from the rear guide surface 74. The top and bottom guides surfaces 70 and 72 respectively engaged the top and bottom surfaces 58a and b of the adjustable indicator follower 42, the rear guide surface 74 engages the spring arms 48a and b, and the guide rib 76 extends between the spring arms 48a and b.

The stationary track 44 has a pointer 78 molded therein to indicate the position of the adjustable indicator follower 42 relative to the male indicator threads 40 on the scale 60.

The mouth 64 of the adjustable indicator follower 42 has one female follower thread 80 (see FIG. 6) therein for engaging the male indicator threads 40.

Figure 4:
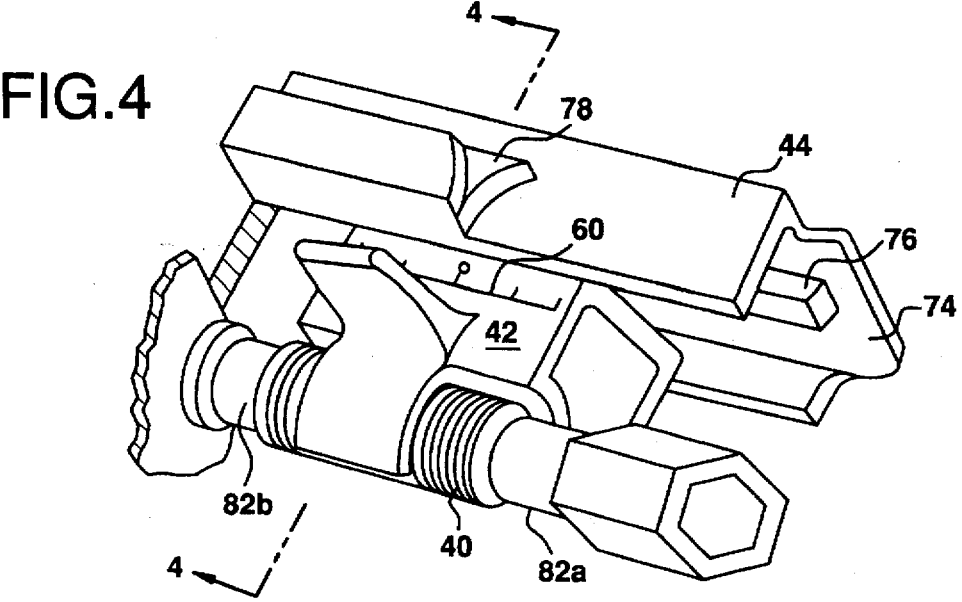
FIG. 4 is an isometric view of an external portion of a threaded shaft having male indicator threads thereon which form a part of the adjustable indicator assembly of FIG. 1 with the adjustable indicator follower of FIG. 2 riding in the stationary track of FIG. 3 engaged therewith.

It can be seen in FIG. 4, as well as in FIG. 1, that the male indicator threads 40 do not extend along the entire knob 30, but rather are bounded by unthreaded portions 82a and b. In this regard, when the female follower thread 80 loses engagement with the male indicator threads 40 at each of the unthreaded portions 82a and b, the knob 30 can be rotated further without damaging the female follower thread 80 or the male indicator threads 40. At the same time, follower stop surfaces 84a and b respectively on the knob 36 and the housing 12 come into contact with stop surfaces 86a and b. These stop surfaces (84a, b and 86a, b) retain the adjustable indicator follower 42 between the knob 30 and the stationary track 34 so that it cannot get lost.

In operation, the adjustable indicator follower 42 can be mounted on the stationary housing 12 before the knob 30 is press fitted on the knurled outer end 34 of the operational-thread member 28. Edges of the operational-thread member 28 and the knob 30 retain the threaded shaft 18 in the bore 20 while allowing the threaded shaft 18 to be rotated therein for adjusting the nut member 22, and the reflector 14 linked thereto, by the ball and socket joint 26.

Figure 5:
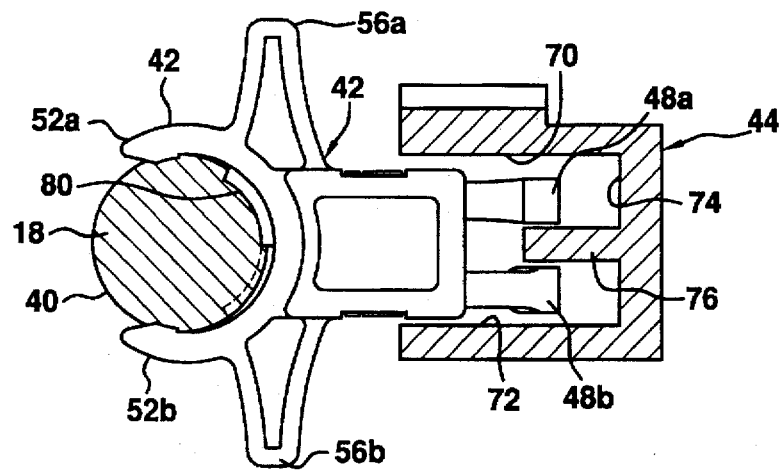
FIG. 5 is a partially cross sectional view taking on line V—V in FIG. 4 when the adjustable indicator follower is in threaded engagement with the male indicator threads of the threaded shaft.
Figure 6:
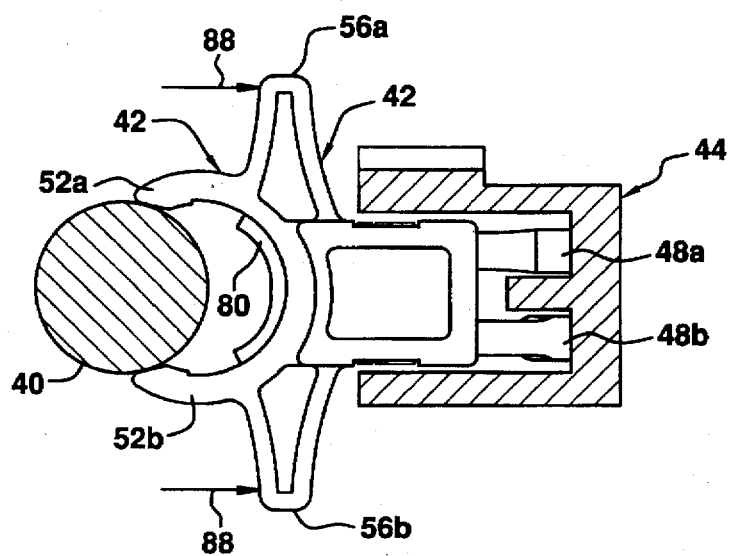
FIG. 6 is a view similar to FIG. 5 but with the adjustable indicator follower pulled out of threaded engagement with the threaded shaft.

Normally, the adjustable indicator follower 42 will be snapped onto the male indicator threads 40 of the threaded shaft 18, as is depicted in FIG. 5. Once a technician rotates the knob 30, either by hand or using a tool, to adjust the reflector 14 to a proper position, the adjustable indicator follower 42 is calibrated to a "zero" position. This is accomplish by applying pressure along arrows 88 in FIG. 6 so as to snap the arc-shaped lips 52a and b from the male indicator threads 40. When such pressure is applied to the winged hand grips 56a and b, which are attached to the arc-shaped lips 52a and b, in this manner it tends to part the arc-shaped lips 52a and b. As the adjustable indicator follower 42 is snapped from the male indicator threads 40, the adjustable indicator follower 42 is moved laterally further into the stationary track 44 and the spring arms 48a and b come into contact with the rear guide surface 74. Even after the arc-shaped lips 52a and b pass over the widest diameter of the male indicator threads 40, and as shown in FIG. 6, the outer tips of the arc-shaped lips 52a and b remain in contact with the male indicator threads 40, being biased there against by the spring arms 48a and b. This helps retain the adjustable indicator follower 42 in a proper attitude. In any event, once the adjustable indicator follower has been laterally moved to the FIG. 6 position, it can be moved longitudally, or axially, relatively to the male indicator threads 40 so as to bring the zero position on the scale 60 to the pointer 78. When the zero position is properly positioned, the adjustable indicator follower 42 is again moved laterally, to the left as shown in FIG. 6, so that its mouth 64 is again snapped about the male indicator threads 40 and the female follower thread 80 is engaged in one of the male indicator threads 40. Although it is difficult to read the scale 60 when the adjustable indicator follower is snapped from the male indicator threads 40, the "zero" position can still be read on the indicia 62 on the winged hand grips 56a and b.

While the invention has been particularly shown and described with reference to a preferred embodiment, it should be understood by those skilled in the art that various changes in form and detail may be made therein without departing from the spirit and scope of the invention.

Figure 7:
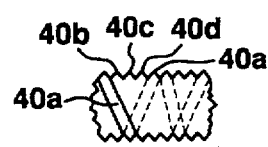
FIG. 7 is a segmented schematic view of the male indicator threads of the threaded shaft.

It will be appreciated by those of ordinary skilled in the art that by having multiple intertwined male threads 40, as shown in FIG. 7, the female follower thread 80 can be finely positioned for properly zeroing positions of the adjustable indicator follower 42; however, movement of the knob 30 of the threaded shaft 18 will cause great linear movement of the adjustable indicator follower 42 from this zero position because of the great pitch of the individual male indicator threads 40. Thus, a technician can easily read such movement by looking at the position of the pointer 78 relative to the scale 60.

It is also beneficial that the adjustable indicator follower has positive thread engagement with the threaded shaft because, in this way, inadvertent movement of the adjustable indicated follower is prevented; while, on the other hand, positive movement of the adjustable indicator follower is caused by rotation of the threaded shaft.

It is also quite beneficial that the adjustable indicator follower 40 can be snapped into and off of threaded engagement while maintaining its orientation and general position. Further, it is beneficial that the adjustable indicator follower can be easily moved longitudally when its female follower thread is no longer engaged with the male indicator threads because in this manner the adjustable indicator follower can be easily zeroed; however it is not likely that it would be inadvertently moved after the female follower thread is again engaged.

It is further beneficial that the adjustable indicator follower 42 has winged handgrips on opposite sides of the mouth formed by the arc-shaped lips because these winged handgrips allow a technician to place even pressure for causing lateral movement toward and away from snapped threaded engagement with the male indicator threads.

The guide rib 76 also improves performance in that it helps to hold the adjustable indicator follower in a proper orientation during lateral and longitudinal movement thereof. In this regard, the guide rib 76, in combination with the spring arms 48a prevents rotation of the adjustable indicator follower with rotation of the threaded shaft 18.

We claim:

1. An adjustable indicator assembly for indicating a position of a reflector of a vehicle lamp, the vehicle lamp having an adjusting device for pivoting the reflector comprising a threaded nut engaging operational threads of a rotatable threaded shaft, said indicator assembly comprising:

male indicator threads formed on an outer surface of the threaded shaft;

an adjustable indicator follower for moving along said threaded shaft, said adjustable indicator follower defining a laterally-opening mouth for receiving said male indicator threads of said threaded shaft when said adjustable indicator follower is brought laterally into threaded engagement with said threaded shaft, said adjustable indicator follower having a female follower thread in said mouth for engaging said male indicator threads when said adjustable indicator follower is brought into threaded engagement with said threaded shaft;

stationary track means for engaging said adjustable indicator follower for allowing said adjustable indicator follower to be moved laterally toward and away from said threaded shaft for moving said adjustable indicator follower into and out of threaded engagement with said threaded shaft, and for allowing said adjustable indicator follower to move longitudally along said threaded shaft, while not allowing said adjustable indicator follower to rotate with said threaded shaft;

whereby said adjustable indicator follower can be moved laterally toward said threaded shaft to be placed in threaded engagement with said threaded shaft so as to be moved longitudally along said threaded shaft as the threaded shaft is rotated to indicate a position to which the reflector is adjusted by the threaded shaft and laterally away from the threaded shaft to remove it from the threaded engagement with the threaded shaft so that it can be moved longitudally along said threaded shaft for calibrating it to a desired position along the threaded shaft.

2. An adjustable indicator assembly as in claim 1 wherein said laterally-opening mouth of said adjustable indicator follower is formed as arc-shaped lips having an opening therebetween, said lips forming a circular cavity which extends greater than 180°, whereby said mouth can be snapped about on and off of the threaded shaft.

3. An adjustable indicator assembly as in claim 2 wherein is further included handgrips formed at said opposite lips of said mouth to be simultaneously engaged to move said adjustable indicator follower laterally relative to said threaded shaft.

4. An adjustable indicator assembly as in claim 3 wherein the track means has a guiding rib extending longitudinally of said track means and said adjustable indicator follower has spring arms for engaging opposite sides of said guiding rib and for pressing against a surface of said track to bias said follower towards said threaded engagement.

5. An adjustable indicator assembly as in claim 4 wherein said adjustable indicator follower has freedom of axial movement along said threaded shaft so that it extends beyond opposite ends of said male indicator threads and wherein said adjustable indicator assembly includes stops located at said opposite ends of said male indicator threads for contacting said adjustable indicator follower when said female follower thread loses engagement with said male indicator threads at said opposite ends to prevent said adjustable indicator follower from leaving said stationary track means.

6. An adjustable indicator assembly as in claim 1 wherein the track means has a guiding rib extending longitudinally of said track means and said adjustable indicator follower has spring arms for engaging opposite sides of said guiding rib.

7. An adjustable indicator assembly as in claim 1 wherein said adjustable indicator follower has freedom of axial movement along said threaded shaft so that it extends beyond opposite ends of said male indicator threads and wherein said adjustable indicator assembly includes stops located at said opposite ends of said male indicator threads for contacting said adjustable indicator follower when said female follower thread loses engagement with said male indicator threads at said opposite ends to prevent said adjustable indicator follower from leaving said stationary track means.

8. An adjustable indicator assembly as in claim 1 wherein said male indicator threads are formed of multiple intertwined threads, each having a coarse pitch.

9. An adjustable indicator assembly as in claim 8 wherein there is a single female follower thread.

* * * * *